Figure 1:
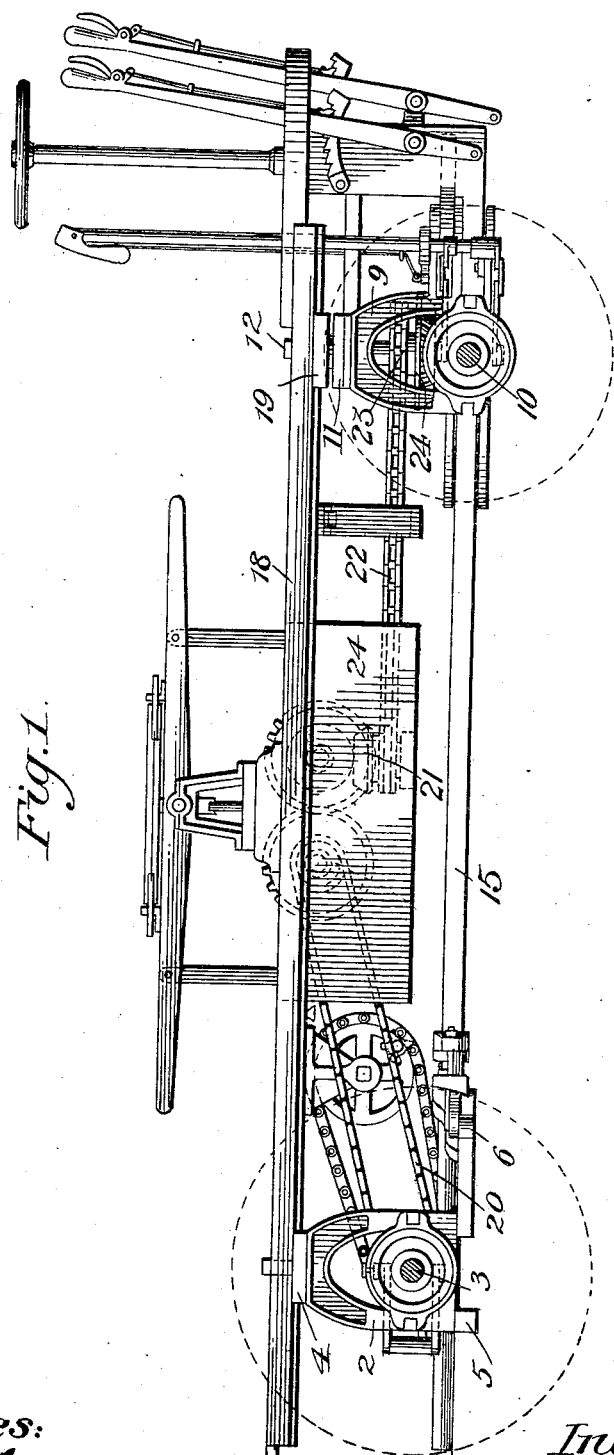

R. H. BOWMAN.
MOTOR VEHICLE.
APPLICATION FILED MAY 29, 1908.

935,582.

Patented Sept. 28, 1909.
3 SHEETS—SHEET 1.

Witnesses:
Inventor.

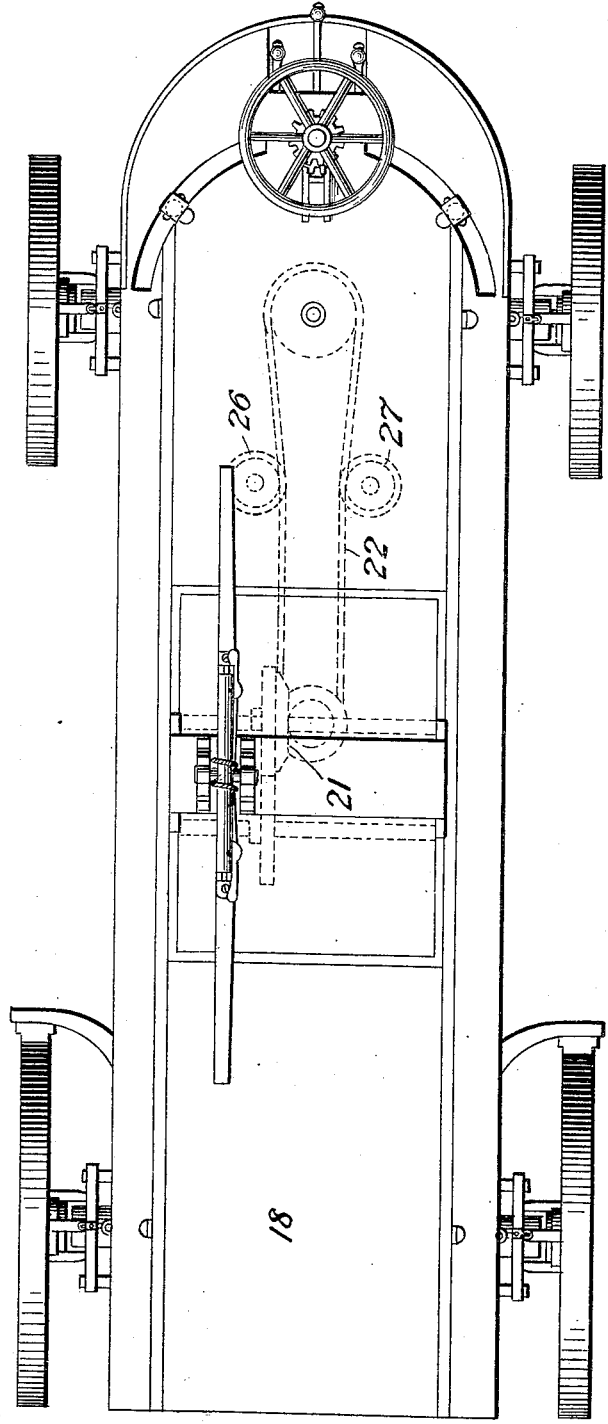

R. H. BOWMAN.
MOTOR VEHICLE.
APPLICATION FILED MAY 29, 1908.
935,582.
Patented Sept. 28, 1909.
3 SHEETS—SHEET 3.
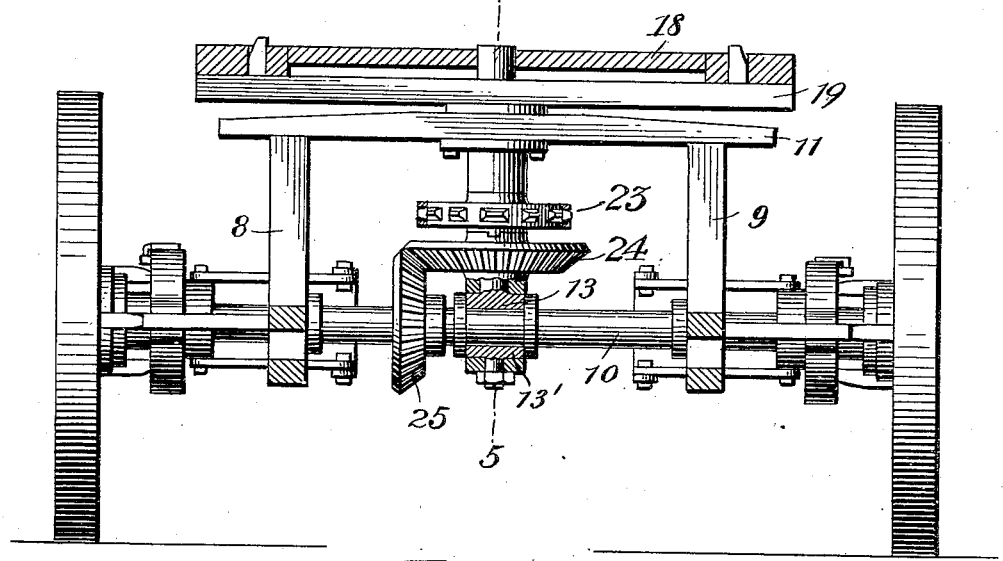
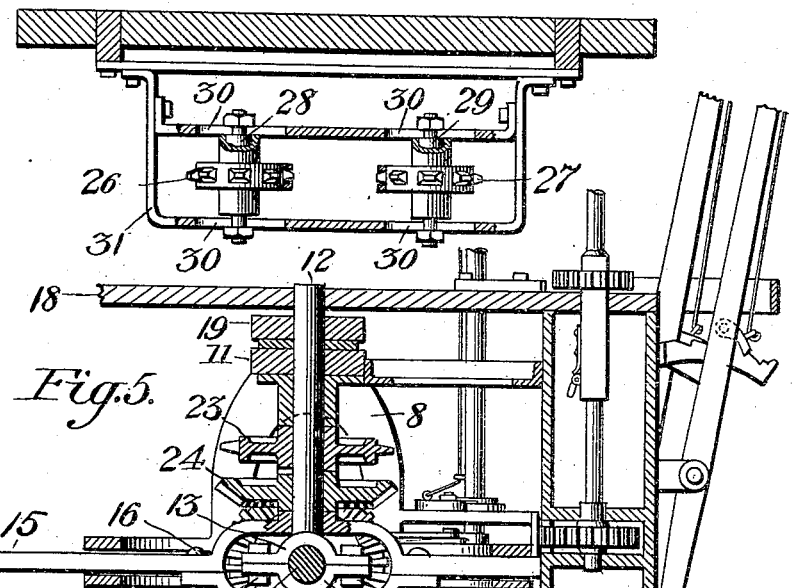

UNITED STATES PATENT OFFICE.

ROBERT HENRY BOWMAN, OF CANON CITY, COLORADO.

MOTOR-VEHICLE.

935,582.  Specification of Letters Patent.  Patented Sept. 28, 1909.

Original application filed October 30, 1907, Serial No. 399,908. Divided and this application filed May 29, 1908. Serial No. 435,617.

*To all whom it may concern:*

Be it known that I, ROBERT HENRY BOWMAN, a citizen of the United States, residing at Canon City, in the county of Fremont and State of Colorado, have invented certain new and useful Improvements in Motor-Vehicles; and I do hereby declare the following to be a full, clear, and exact description of the invention, such as will enable others skilled in the art to which it appertains to make and use the same.

This invention relates to improvements in motor vehicles, the application being a division of an application filed by me October 30, 1907, Serial Number 399,908, and the principal object of the invention is to provide an improved running gear for the forward axle of the vehicle, which running gear is comparatively simple and economical in structure and very strong and durable.

A further object of the invention is to provide a king bolt or pin which is loosely secured to and supported by the said forward axle of the vehicle.

A still further object of the invention is to provide a novel means for detachably securing the reach bar to the forward truck of the vehicle.

With these and other objects in view, the invention consists in certain novel details of construction and combinations and arrangement of parts, all as will be now described and the particular features of novelty pointed out in the appended claim.

In the drawings:—Figure 1 is a side elevation of my improved motor vehicle, illustrating the manner of connecting the power mechanism with the running gear for the forward axle. Fig. 2 is a plan view of the same. Fig. 3 is a rear elevation of the forward truck of the vehicle, the same being shown partly in section. Fig. 4 is a cross sectional view of the drive chain adjusting mechanism, and Fig. 5 is a vertical section of the forward truck of the vehicle taken on the line 5—5 of Fig. 3.

Corresponding and like parts are referred to in the following description and indicated in the several views of the drawings by the same reference characters.

The vehicle illustrated is shown as having two truck frames and a body frame. The rear truck frame is formed of two standards 2, only one being shown within which the rear axle 3 is journaled, said standards being connected together at the top and bottom thereof by the transverse beams 4 and 5, as best shown in Fig. 1 of the drawings. Also extending from the standards 2 and preferably in curved form in front of the rear axle, is a cross piece 6 which serves as the guide and support for a reach bar extending from the forward truck and connected to the rear truck. The forward truck frame is likewise constructed with two standards 8 and 9 having suitable bearings for the forward axle 10, said standards connected together at their upper ends by the transverse beam 11 as clearly shown in Fig. 3.

Supported by the forward axle is a king bolt 12, the same being loosely secured to said axle by means of the clamp plates 13 and 13', which are so formed as to fit about the axle, and in which position they are adapted to be retained by suitable bolts 14, or other fastening devices. In the preferred construction, the king bolt is formed integral with the upper securing clamp plate 13, although it may, if found desirable, be of a separate piece and attached thereto in any preferred manner.

The reach bar, heretofore referred to, is indicated at 15, and serves as the connecting means between the forward and rear trucks, said reach bar at its forward end being journaled about the king bolt 12, and held in proper position by means of the clamping plate 15', which is secured to the end of the reach bar by means of the bolts 16. The said clamping plate 15' is also journaled about an extension 17 formed on the clamping plate 13' which secures the king bolt in place upon the forward driving axle. In this manner it will be readily understood that the reach bar is loosely connected to the king bolt, and thus permits the forward truck to move either in one direction or the other in steering the vehicle. It is also to be noted that the end of the reach bar which is secured to the king bolt, is curved, as is also the clamping plate 15', and this being for the purpose of accommodating between them the forward axle and the king bolt clamping plates 13 and 13'. The reach bar at its other end is preferably made round in cross section, and is adapted to slide within an opening formed in the reach guide 6, to which it is fastened.

The body frame is indicated at 18, and as represented in the accompanying drawings merely shows the floor frame-work of the motor vehicle, the same being illustrated as supported directly upon the transverse beam 4 of the rear truck, and the cross beam 19, which is journaled about the king bolt 12. It is to be understood, however, that the body frame of the vehicle may be carried upon its truck frames in any other manner than that heretofore described, and that said body frame may be supported, for instance, by means of springs in the usual and well known way.

While it is to be understood that a motor of any desired type may be used for operating the running gear of the vehicle, it is preferred, however, to provide a motor mechanism which is adapted to be operated by hand when desired. Said motor is connected up with the forward axle of the vehicle for driving the same in a manner to be hereinafter described, and said motor may also be connected with the rear axle 3 by means of the drive chain 20 for driving this axle in the well known way.

Power is transmitted to the forward axle of the vehicle from the motor, by means of suitable gearing, such as indicated at 21, through the chain 22, sprocket wheel 23, and bevel gears 24 and 25, the bevel gear 25 being keyed to the forward axle. The sprocket wheel 23 and the bevel gear 24 are loosely mounted on the king bolt 12, and are keyed together so that as the sprocket wheel 23 is rotated in either direction, said bevel gear 24 will be driven in the same direction. As has been stated the bevel gear 25 is keyed to the forward axle, and said gear is adapted to mesh with the bevel gear 24, so that in this manner said axle may be driven from the motor.

In Fig. 4 of the drawing is illustrated a means for taking up the slack in the chain 22, the same consisting of sprocket wheels 26 and 27 which are journaled on shafts 28 and 29 respectively, said shafts being adjustably mounted in slots 30 in the frame-work 31 which is secured to the under side of the body frame of the vehicle.

What I claim is:—

In a motor vehicle, the combination with the front truck including two standards connected at their upper ends by a centrally apertured cross piece and bearings on the lower ends of the standards, of a rotary axle mounted in said bearings, ground wheels on the ends of the axle, a king bolt extending at its upper end through said cross piece to form the pivot of the truck and provided at its lower end with a clamp embracing the axle, a reach bar connected at its forward end with the lower end of the king bolt at opposite sides of said clamp, a bevel gear turning on the king bolt adjacent to the upper side of the reach bar and provided with a driving member, and a bevel gear on the axle and meshing with the first named bevel gear, substantially as set forth.

In testimony whereof I affix my signature, in presence of two witnesses.

ROBERT HENRY BOWMAN.

Witnesses:
J. M. BEANE,
W. W. EMMERSON.